July 21, 1959   W. E. MEISSNER   2,895,172
METHOD OF CENTRIFUGALLY FORMING ARCH WALL TUBING
Filed Oct. 10, 1955
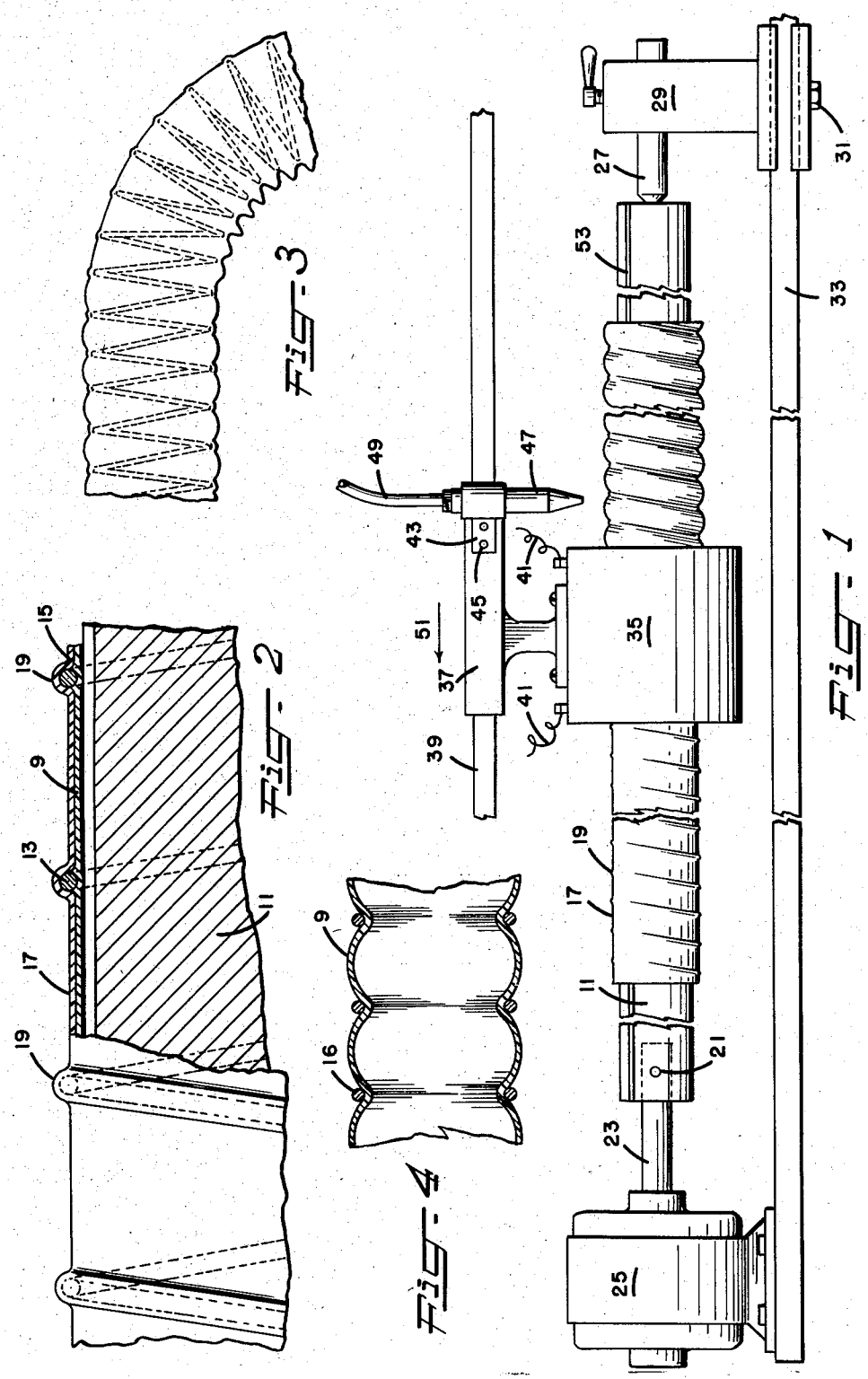

United States Patent Office 2,895,172
Patented July 21, 1959

2,895,172

METHOD OF CENTRIFUGALLY FORMING ARCH WALL TUBING

William E. Meissner, Devon, Pa.

Application October 10, 1955, Serial No. 539,355

3 Claims. (Cl. 18—56)

The invention relates to tubing, and particularly to flexible reinforced plastic tubing having an outwardly arched wall or cross-section between reinforced areas.

In my United States Patents 2,608,720 and 2,609,002, and my copending United States patent application Ser. No. 307,959, filed September 5, 1952 and now abandoned, I have described various methods of forming flexible reinforced plastic tubing by applying an inner and outer layer of plastic material on a preformed mold or mandrel with a spiral or ring reinforcement interposed between the layers. The plastic material layers are then fused or adhesively secured to each other, after which the mold or mandrel is broken to facilitate its removal. Tubing formed in accordance with the above-noted disclosures has a finished configuration somewhat similar to that of the outer periphery of the mold or mandrel on which it is formed, and these disclosed methods have, to some degree, been satisfactory in forming tubing having an outwardly arched wall between reinforced areas. However, since many of the plastic materials have a tendency to contract when heated, the arched walls are not as pronounced as the protuberances on the mold or mandrel, and are not entirely satisfactory for many uses. Furthermore, the use of specially shaped frangible mandrels with each length of tubing formed does not readily lend these prior methods to economical mass production techniques. It is therefore an object of this invention to provide a generally improved method of forming flexible reinforced plastic tubing having an outwardly arched wall or cross-section between reinforced areas.

Another object is to provide an improved method of forming reinforced plastic tubing which may be easily flexed into a bent position, and in which the portions of the tubing between reinforced areas will fold outwardly at the smaller radius of the bend to provide a substantially unobstructed flow passage through the tubing.

Still another object is to provide a method of making arched wall reinforced plastic tubing by subjecting a reinforced plastic tube to heat while simultaneously rotating the tube about its axis at high speed to cause the unreinforced tube areas to bulge or arch outwardly and be set in arched position by subsequent cooling.

A further object is the provision of an improved method of making reinforced plastic tubing in which additional reinforcement of fixtures or a sheath can be applied or embedded within the tubing simultaneously with the arching of the tube walls between the reinforced areas.

A still further object of the invention is to provide an improved method of making a reinforced plastic tubing in which all or portions of the tubing walls extending between reinforced areas are arched, can be easily controlled to vary the degree or magnitude of arching of the walls, and is simple and economical in use.

These and other objects and advantages of the invention will be apparent from the following description and accompanying drawing in which:

Fig. 1 is a front view of one form of apparatus for practicing the method of the present invention;

Fig. 2 is a fragmentary view, partly in section, illustrating a mandrel on which is positioned a section of plastic tubing for processing in accordance with the present invention;

Fig. 3 discloses a portion of a finished plastic tubing section in bent position; and Fig. 4 is a longitudinal vertical section of a modified arched wall tubing formed in accordance with the present invention.

The invention, in general, is directed to a method of forming reinforced plastic tubing having an outwardly arched wall or cross-section between reinforced areas to provide a finished tubing which can be easily bent without its wall obstructing or otherwise constricting the passage extending through the tubing. In accordance with the present invention, reinforced plastic tubing, having straight walls extending between reinforced areas, is positioned snugly on a cylindrical mandrel which in turn is rotated at high speed. During rotation, the plastic tubing is subjected to heat, softening the plastic material and thus enabling it to flow more readily in response to the centrifugal force developed by the rotation of the mandrel. The combined effects of the heat and the centrifugal force cause the wall of the plastic tubing between reinforced areas to bow or arch outwardly away from the mandrel, in which position the plastic material is set by subsequent application of a chilling or cooling medium.

In forming the tubing of the present invention, a thin walled plastic tubing 9 is first mounted on a cylindrical mold or mandrel 11 of substantially the same diameter throughout its length. A coiled reinforcing spring 13 of a relatively large pitch in its normal unstressed state is then applied onto the mandrel 11 over the tubing 9. An outer layer 15 of plastic wall material may be then applied over the reinforcing spring if desired, and the inner and outer layers 9 and 15 are then fused or otherwise secured to each other. It will of course be understood that the present invention is adapted for use with any type of reinforced straight wall tubing, which may, for example, be of seamless construction or have a spiral seam. Further, as shown in Fig. 4, ring-shaped reinforcements 16, fitting snugly or adhesively secured over the tubing 9 and spaced axially along the mandrel, may be substituted for the coiled reinforcing spring 13 if desired. The method thus far described is somewhat similar to that disclosed in my above-noted copending application and United States patents, with the exception that a smooth surfaced mandrel of substantially the same diameter throughout its length is employed, rather than a mandrel having specially forced protuberances along its length. At this stage in the method, the tubing is substantially as shown in Fig. 2 with its walls 17 being straight between the reinforced portions 19.

The mandrel 11, with the tubing applied thereto, is then positioned within any suitable apparatus which is capable of imparting a rapid rotary movement to the mandrel. As shown in Fig. 1, one end of the mandrel 11 is hollowed out and secured by screw 21 to the free end of the shaft 23 of the motor 25 while its opposite end is engaged by the adjustable center 27 of the support 29 which is releasably secured by the bolt 31 to the base plate 33 for slidable movement therealong. It will of course be understood that the apparatus shown in Fig. 1 is merely an example of one type of apparatus found suitable for carrying out the invention, and if desired both ends of the mandrel may be supported on centers, as in the conventional lathe, or on rollers with a driving force being applied directly to the mandrel itself. An electric heating element 35 encircles the mandrel and is supported by a bracket 37 which is slidable along the guide 39 extending parallel to the axis of the mandrel 11 and fixed to suitable structure not shown. The heating element 35 may be of conventional construction having a resistance element providing the necessary heat when energized through the conductors 41 connected to a suitable electric source, not shown. By means of the clamp 43 and screws 45, a jet 47 is fixed to one end of the bracket 37 so as to trail the heating element 35 as it moves along its path as hereinafter described. A flexible hose 49 is connected at one end to the inlet end of the jet 47 for conducting a chilling or cooling medium thereto from any suitable source.

In practicing the method of the present invention, the mandrel with the partially formed tubing snugly mounted thereon is positioned as shown in Fig. 1. The motor 25 is then energized to rotate the mandrel 11 about its axis at a relatively high speed and the heating element 35 is moved in a direction parallel to the mandrel 11 as shown by the arrow 51 to soften the plastic material of the tubing and render it, to some degree, flowable. The combined effects of the centrifugal force developed by the rotating mandrel and the softening of the plastic material cause the tubing walls 17 between the reinforced portions 19 to bulge or arch outwardly away from the mandrel 11 as seen at the right side of Fig. 1. As the heating element 35 continues along its path in the direction of arrow 51, the bulged or arched walls of the tubing are subjected to a chilling medium, preferably air, supplied through the nozzle 47. This chilling effect sets or stabilizes the arched walls so that further arching or collapse of the walls to their original position is not possible. Once the heating element reaches the end of its travel, the rotary movement of the mandrel 11 is stopped and the finished tubing is removed. A new mandrel with a partially finished plastic tubing may be then positioned within the apparatus for processing as described above, or a new section of plastic tubing may be snugly telescoped onto the first mandrel employed.

In order that full advantage may be taken of the centrifugal force developed by the rotating mandrel 11 and to prevent collapse of the arched walls of the finished tubing, the mandrel 11 is provided with one or more longitudinally extending grooves 53 on its periphery to permit air to enter into the spaces formed as the tubing walls are arched outwardly. The softening of the plastic material of the tubing may be accomplished by any suitable means other than that described above as for example by heating the mandrel itself, or by a combined heating of the mandrel and a movable heating element 35 or electronically by a high frequency current induction oven. Further, it will be understood that the heating element may remain stationary while the mandrel itself is moved axially relative thereto.

From the above described method, it is obvious that the total length of the tubing need not be subjected to heat and thus the finished tubing can be provided with walls having a straight and arched cross-section at desired intervals. For most uses, the tubing formed as described above is satisfactory. However, if a tubing having a greater reinforcement is desired, the walls of the tubing may be provided with a partial arching, in a manner as set forth above, after which a stockingette or sheath of flexible and resilient material, as for example wire mesh, is applied over the partially formed tubing which is then subjected to additional heating and centrifugal force to cause further arching of the tubing walls. By means of this additional arching, the stockingette is embedded within the plastic wall of the tubing. Instead of a stockingette or sheath, various fixtures or connectors may be applied at various portions of the tubing in a manner last described above.

The finished tubing will have a configuration as shown in Figs. 3 and 4 and readily adapted to be bent into any desired angle and is found to be most satisfactory as a conduit for liquid or gases, as for example an air conditioning system, blowers or vacuum sweepers, or speaking tubes. By imparting an outwardly extending arch cross-section to the walls between the reinforced areas of the tubing, the tubing can be bent without its passage being in any way obstructed, since the arched wall areas, at the small radius of the curvature, are automatically folded in an outward position as shown in Fig. 3. Further, with the construction in Fig. 4, the arched areas of the tubing prevent any axial movement of the rings 16 which satisfactorily reinforce the tubing without subjecting it to any radial or collapsing stress.

The plastic material employed in forming the tubing may be thin flexible plastic material capable of being molded, shaped and sealed to itself by heating, such as any of the thermoplastic cellulose derivatives and thermoplastic synthetic resins, as set forth more fully in my copending application and United States patents mentioned above. The reinforcement of the present tubing may be formed of plastic material which is the same or different from that plastic used in the wall of the tubing or may be of metal. It is seen from the above description that the method of the present invention provides a finished tubing having uniformly arched walls extending between the reinforced areas. Furthermore, the arching of the walls can be varied in degree or spaced longitudinally of the plastic tubing by merely varying the centrifugal force, the amount of heating, and the longitudinal travel of the heating element.

It is seen from the above description that the objects of the invention are well fulfilled by the method described. The description is intended to be illustrative only and it is to be understood that changes and variations may be made without departing from the spirit and scope of the invention as defined by the appended claims.

I claim:

1. A method of providing reinforced plastic tubing with an arched wall between reinforced areas including the steps of rotating the plastic tubing about its axis to exert a centrifugal force on the tubing wall, softening the tubing progressively along its length during the rotation thereof to cause the same to plastically flow and effect an outward arching of said softened wall between reinforced areas, and progressively stabilizing the softened wall while said tubing is rotated to set the same in its arched position.

2. A method forming reinforced plastic tubing with an an arched wall between reinforced areas including the steps of disposing a plastic material snugly about a substantially cylindrical form, embedding a narrow reinforcing strip therein to provide a tubing having straight walls between reinforced areas, rotating the plastic tubing about its axis to exert a centrifugal force on the tubing wall, progressively softening the tubing along its length concomitantly while said centrifugal force is applied to cause the same to plastically flow and arch radially outward between reinforced areas, and stabilizing the softened wall while the centrifugal force is applied to set the same in its arched position.

3. A method as defined in claim 1 wherein said tubing wall is progressively softened by heat and progressively stabilized by a jet of cool air.

References Cited in the file of this patent

UNITED STATES PATENTS

| | | |
|---|---|---|
| 2,392,992 | Martin | Jan. 15, 1946 |
| 2,431,102 | Ames | Nov. 18, 1947 |
| 2,584,501 | Roberts | Feb. 5, 1952 |

OTHER REFERENCES

Bailey: "Blow Molding Opens Opportunities to Plastics," in Plastics, vol. 2, No. 4, pp. 20, 72, 74, 75, 118, 119 and 120, (April 1945), published by Ziff-Davis Publishing Co., Chicago, Illinois.